United States Patent
Sakurada

(10) Patent No.: US 11,379,762 B2
(45) Date of Patent: Jul. 5, 2022

(54) AUTOMATED TRAVEL VEHICLE ASSISTANCE SYSTEM AND SERVER

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 16/582,245

(22) Filed: Sep. 25, 2019

(65) Prior Publication Data
US 2020/0143295 A1    May 7, 2020

(30) Foreign Application Priority Data
Nov. 1, 2018  (JP) .............................. JP2018-206812

(51) Int. Cl.
| | |
|---|---|
| *G06Q 10/02* | (2012.01) |
| *G06Q 10/00* | (2012.01) |
| *G08G 1/00* | (2006.01) |
| *G07C 5/00* | (2006.01) |
| *G06Q 50/30* | (2012.01) |

(52) U.S. Cl.
CPC ............ *G06Q 10/02* (2013.01); *G06Q 10/20* (2013.01); *G06Q 50/30* (2013.01); *G07C 5/008* (2013.01); *G08G 1/202* (2013.01); *B60W 2556/45* (2020.02)

(58) Field of Classification Search
CPC ........ G06Q 10/02; G06Q 10/20; G06Q 50/30; G07C 5/008
See application file for complete search history.

(56) References Cited

U.S. PATENT DOCUMENTS

| | | | |
|---|---|---|---|
| 2007/0218892 A1* | 9/2007 | Tolhurst ................ | H04W 88/06 455/422.1 |
| 2011/0025267 A1* | 2/2011 | Kamen ................... | B60L 55/00 320/109 |
| 2018/0322775 A1* | 11/2018 | Chase .................... | H04W 12/06 |

(Continued)

FOREIGN PATENT DOCUMENTS

| | | | |
|---|---|---|---|
| JP | 07154856 A | * | 6/1995 |
| JP | 2012-190412 A | | 10/2012 |
| JP | 2015-79453 A | | 4/2015 |

(Continued)

*Primary Examiner* — Anne Marie Antonucci
*Assistant Examiner* — Jingli Wang
(74) *Attorney, Agent, or Firm* — Oblon, McClelland, Maier & Neustadt, L.L.P.

(57) ABSTRACT

An automated travel vehicle assistance system includes: plural first vehicles, each of which is used for movement of a user; one or more types of second vehicles, each of which has a different function from the first vehicle; and a server that manages operation of the first vehicles and the second vehicles. A first information processing section of the first vehicle generates a service request on the basis of a specified condition, and, when receiving the service request from the first vehicle, the server determines at least one of the first vehicle, which differs from the above first vehicle, and the second vehicle as a service-providing vehicle and generates a service provision instruction to dispatch the determined service-providing vehicle to the first vehicle transmitting the service request.

11 Claims, 7 Drawing Sheets

(56) References Cited

U.S. PATENT DOCUMENTS

2019/0019051 A1\* 1/2019 Saito .................... G06K 9/3241
2019/0197497 A1\* 6/2019 Abari ................... G05D 1/0027

FOREIGN PATENT DOCUMENTS

| JP | 2017-174208 A | 9/2017 | |
|----|----|----|----|
| WO | WO-2018004638 A1 \* | 1/2018 | ........... G07C 5/0833 |
| WO | WO-2020009590 A1 \* | 1/2020 | ......... G01C 21/3691 |

\* cited by examiner

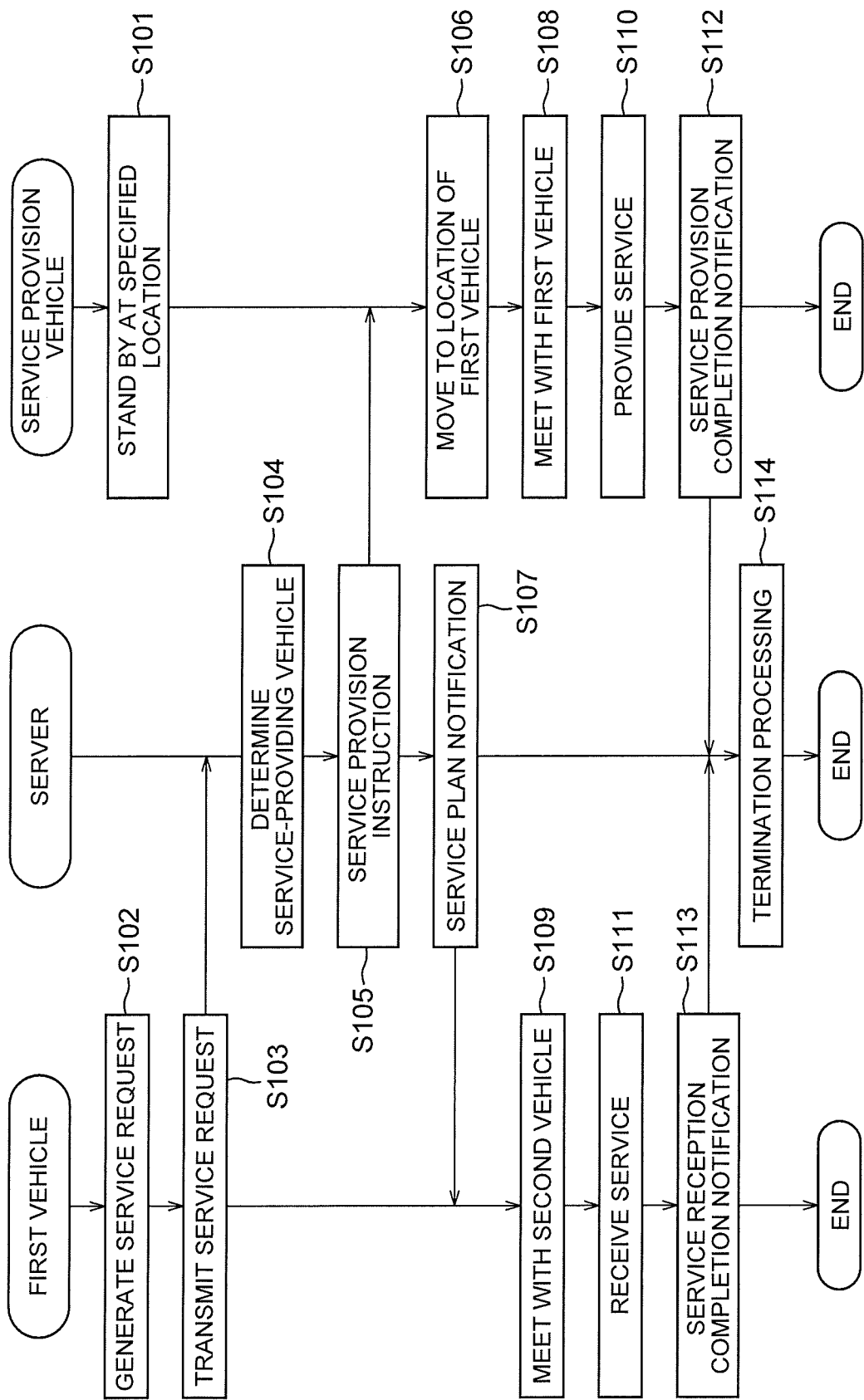

AUTOMATED TRAVEL VEHICLE ASSISTANCE SYSTEM AND SERVER

INCORPORATION BY REFERENCE

The disclosure of Japanese Patent Application No. 2018-206812 filed on Nov. 1, 2018 including the specification, drawings and abstract is incorporated herein by reference in its entirety.

BACKGROUND

1. Technical Field

The disclosure relates to an automated travel vehicle assistance system and a server.

2. Description of Related Art

Conventionally, a system that accepts reservation information from a user who attempts to use an automated driving vehicle, creates a vehicle dispatch plan on the basis of this reservation information, and transports the user from the user's desired get-on location to a destination by the automated driving vehicle at reserved time has been proposed (for example, see Japanese Patent Application Publication No. 2017-174208 (JP 2017-174208 A)). The system disclosed in JP 2017-174208 A is provided with a control center that can communicate with the automated driving vehicle. Thus, even in the case where travel by the automated driving becomes impossible, travel by remote operation is enabled.

SUMMARY

In the system disclosed in JP 2017-174208 A, the automated driving vehicle is adopted for a taxi. However, the automated driving vehicle not only transports persons and/or objects but also is expected for use as a mobile hotel, office, restaurant, shop, entertainment space, and the like. In the case where the automated driving vehicle is used for any of such wide applications, it is desired to provide various services according to the applications and to provide services enhancing potential of the automated driving vehicle. For example, in the case where the automated driving vehicle is used as the mobile hotel, it is requested to provide services, such as food and drinks, and comfortability in addition to assistance in mobility.

The disclosure has been made in view of such circumstances and therefore has a purpose of providing an automated travel vehicle assistance system and a server capable of providing various services to an automated travel vehicle and a user of the automated travel vehicle.

An automated travel vehicle assistance system according to one aspect of the present disclosure for solving the above problem is an automated travel vehicle assistance system including: plural first vehicles, each of which used for movement of a user; one or more types of second vehicles, each of which has a different function from the first vehicle; and a server that manages operation of the first vehicles and the second vehicles. Each of the plural first vehicles includes a first travel control section, a first communication section, and a first information processing section. The first travel control section is configured to be able to control such that the first vehicle, on which the first travel control section is mounted, is made to travel with at least one of the another first vehicle and the second vehicle in alignment on the basis of an instruction from the server. The first information processing section generates a service request on the basis of a specified condition, and the first communication section transmits the service request, which is generated by the first information processing section, to the server. When receiving the service request from the first vehicle, the server corresponds to the service request, determines at least one of the first vehicle, which differs from the first vehicle transmitting the service request, and the second vehicle as a service-providing vehicle, generates a service provision instruction to dispatch the determined service-providing vehicle to the first vehicle transmitting the service request, and transmits the service provision instruction to the service-providing vehicle.

A server according to another aspect of the present disclosure for solving the above problem is a server that manages operation of plural first vehicles, each of which is used for movement of a user, and one or more types of second vehicles, each of which has a different function from the first vehicle, and that includes a server communication section; and a server information processing section. The server communication section is configured to be able to receive a service request from the first vehicle. The service request is generated by the first vehicle on the basis of a specified condition. The server information processing section is configured to correspond to the service request when receiving the service request from the first vehicle, determine at least one of the first vehicle, which differs from the first vehicle transmitting the service request, and the second vehicle as a service-providing vehicle, and generate a service provision instruction to dispatch the determined service-providing vehicle to the first vehicle transmitting the service request. The server communication section is configured to be able to transmit the service provision instruction to the service-providing vehicle.

The disclosure can provide the automated travel vehicle assistance system and the server capable of providing the various services to an automated travel vehicle and a user of the automated travel vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a view for illustrating a processing flow of the automated travel vehicle assistance system.

DETAILED DESCRIPTION OF EMBODIMENTS

A description will hereinafter be made on an embodiment of the present disclosure with reference to the drawings.

Note that the drawings, which will be used in the following description, are schematic and a dimension ratio and the like in each of the drawings do not always match the actual dimension ratio and the like.

Figure 1:
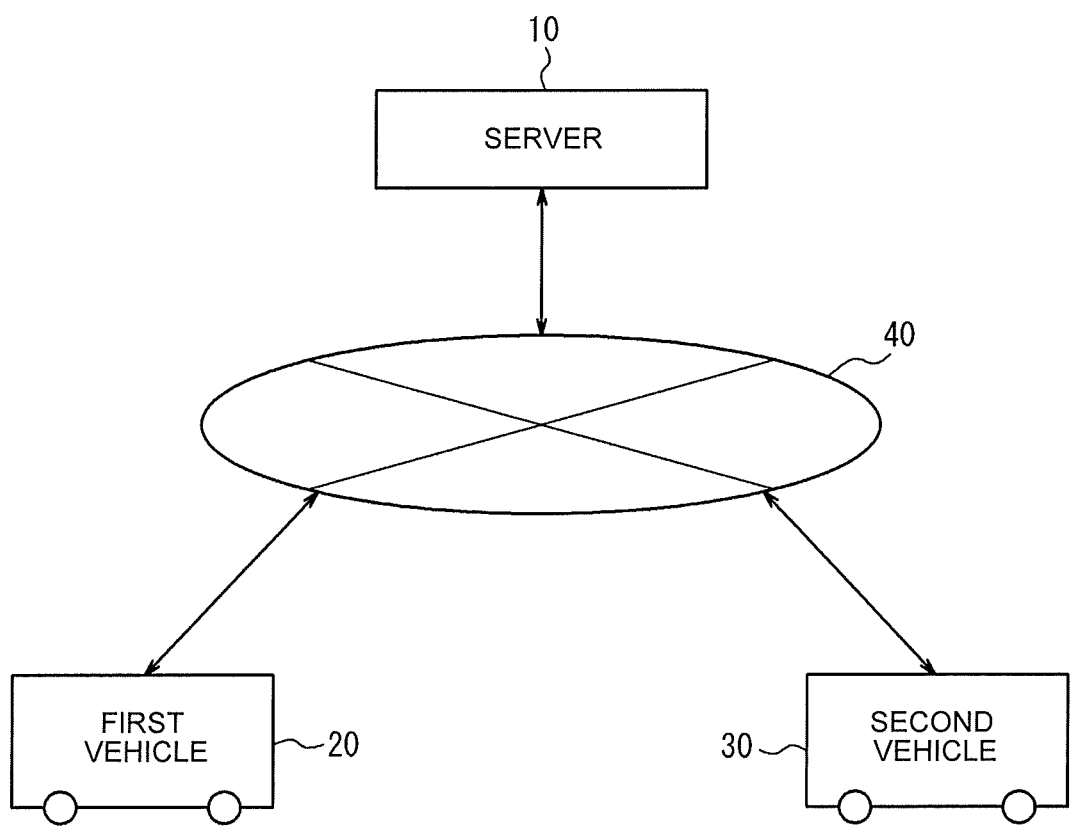
FIG. 1 is a block diagram of a schematic configuration of an automated travel vehicle assistance system according to an embodiment of the disclosure.

A description will be made on an overview of an automated travel vehicle assistance system 1 according to the one embodiment of the disclosure with reference to FIG. 1. The automated travel vehicle assistance system 1 includes a server 10, plural first vehicles 20, and plural second vehicles 30. FIG. 1 only illustrates the single first vehicle 20 and the single second vehicle 30. The server 10, the first vehicle 20, and the second vehicle 30 can communicate with each other via a communication network 40 such as the Internet or a wireless communication network. The automated travel vehicle assistance system 1 provides various services to the first vehicle 20 that travels automatically and is used by a user. The automated travel vehicle assistance system 1 can be used to provide Mobility-as-a-Service (MaaS). A service provider can provide MaaS such as a mobile hotel, a package tour, or ride-sharing by using the server 10, the first vehicle 20, and the second vehicle 30. The second vehicle 30 is a service-providing vehicle that has a different function from the first vehicle 20. The server 10 manages operation of the first vehicle 20 and the second vehicle 30. A description will hereinafter be made on a configuration of each section of the automated travel vehicle assistance system 1.

Figure 2:
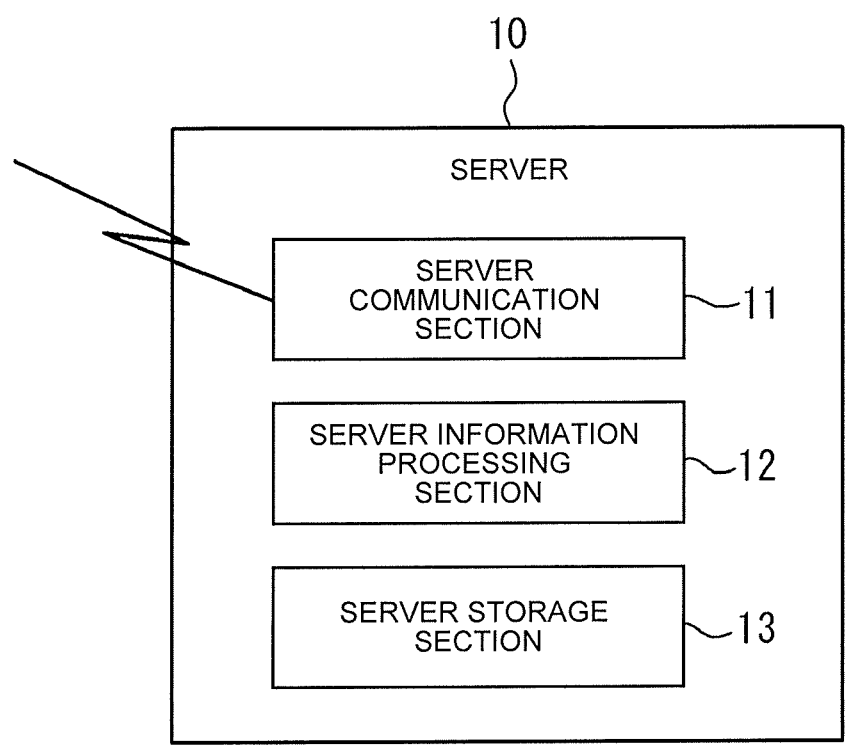
FIG. 2 is a block diagram of a schematic configuration of a server in FIG. 1.

(Server Configuration) As illustrated in FIG. 2, the server 10 includes a server communication section 11, a server information processing section 12, and a server storage section 13. It is not limited that the server 10 is constructed of a single unit of hardware, and the server 10 may be constructed of plural units of the hardware that are connected to each other by a local area network (LAN) or the like. In addition, the plural units of the hardware, in which server functions are installed, may be dispersed geographically via the communication network 40.

The server communication section 11 includes a communication module that is connected to the communication network 40. The communication module is any of the communication modules corresponding to various communication standards such as the wired LAN, the wireless LAN, an optical communication line, and a digital subscriber line. In this embodiment, the server 10 is connected to the communication network 40 via the server communication section 11. The server communication section 11 can receive a service request from the first vehicle 20. The server communication section 11 can transmits a service provision instruction to the second vehicle 30.

The server information processing section 12 is configured by including one or plural processors and memory. In the present disclosure, the processor is any of a general-purpose processor that reads a specified program to execute a programmed function and a dedicated processor that is specialized in handling specified processing. As the dedicated processor, a digital signal processor (DSP), an application-specific integrated circuit (ASIC), a field-programmable gate array (FPGA), or the like can be adopted. The memory can store the program executed by the processor, information during arithmetic processing by the processor, and the like.

The server information processing section 12 controls operation of the entire server 10. For example, the server information processing section 12 acquires location information of the first vehicle 20 and the second vehicle 30 via the server communication section 11. When acquiring the location information of the first vehicle 20 and the second vehicle 30, the server information processing section 12 stores and manages the location information in the server storage section 13. The server information processing section 12 can exchange various types of information with the first vehicle 20 and the second vehicle 30 via the server communication section 11. When receiving the service request from the first vehicle 20, the server information processing section 12 can determine one of the first vehicle 20, which differs from the first vehicle 20 transmitting the service request, and the second vehicle 30 as the service-providing vehicle. The server information processing section 12 can generate the service provision instruction to dispatch the determined service-providing vehicle to the first vehicle 20 that transmits the service request. The server information processing section 12 can transmit the generated service provision instruction to the service-providing vehicle via the server communication section 11.

The service request can include: identification information that identifies the first vehicle 20 requesting the service; and information on a content of the requested service, time at which the service should be provided, and the like. The service provision instruction can include: the identification information of the first vehicle 20, to which the service is provided; and information on a content of the service to be provided, the time at which the service should be provided, a service provision location, and the like.

The server information processing section 12 may manage the entire operation of the first vehicle 20 and the second vehicle 30. For example, the server information processing section 12 may manage information on a destination, a stopover location, planned arrival date and time, and the like of the first vehicle 20, and may remotely control the operation of the first vehicle 20. For example, the first vehicle 20 is possibly provided as means of transportation and accommodation for the package tour provided by a travel agency. In this case, according to an itinerary of the package tour, the first vehicle 20 travels automatically with tour participants on board. In addition, in consideration of an operation plan of the first vehicle 20, the server information processing section 12 determines a location where the second vehicle 30 is dispatched, and controls the operation of the second vehicle 30. The server information processing section 12 can control the first vehicle 20 and the second vehicle 30 such that the first vehicle 20 and the second vehicle 30 are parked in the same facility (a parking lot, a rest area, or the like) or at adjacent locations, so as to allow the second vehicle 30 to provide the service to the first vehicle 20.

The server storage section 13 includes at least one unit of the memory or a storage device. The memory can be any of read only memory (ROM), random access memory (RAM), flash memory, and the like. The RAM can be any of dynamic RANI (DRAM) and static RAM (SRAM). The storage device is any of a semiconductor storage device, a magnetic storage device, and an optical storage device. The semiconductor storage device is a solid state drive (SSD) using the flash memory, or the like. The magnetic storage device includes: a magnetic tape, a floppy® disk, a hard disk, or the like; and a drive system of one of these. The optical storage device includes: a compact disc (CD), a digital versatile disc (DVD), a Blu-ray® disc, or the like; and a drive system of one of these, for example.

The server storage section 13 stores any information used for operation of the server 10. For example, the server storage section 13 may store a system program, an application program, and road map information. In addition, the server storage section 13 may store the latest location information, a latest travel route, and a latest travel time of each of the first vehicle 20 and the second vehicle 30. The server storage section 13 may store information on the service request received from the first vehicle 20 and information on the service provision instruction transmitted to the second vehicle 30.

Figure 3:
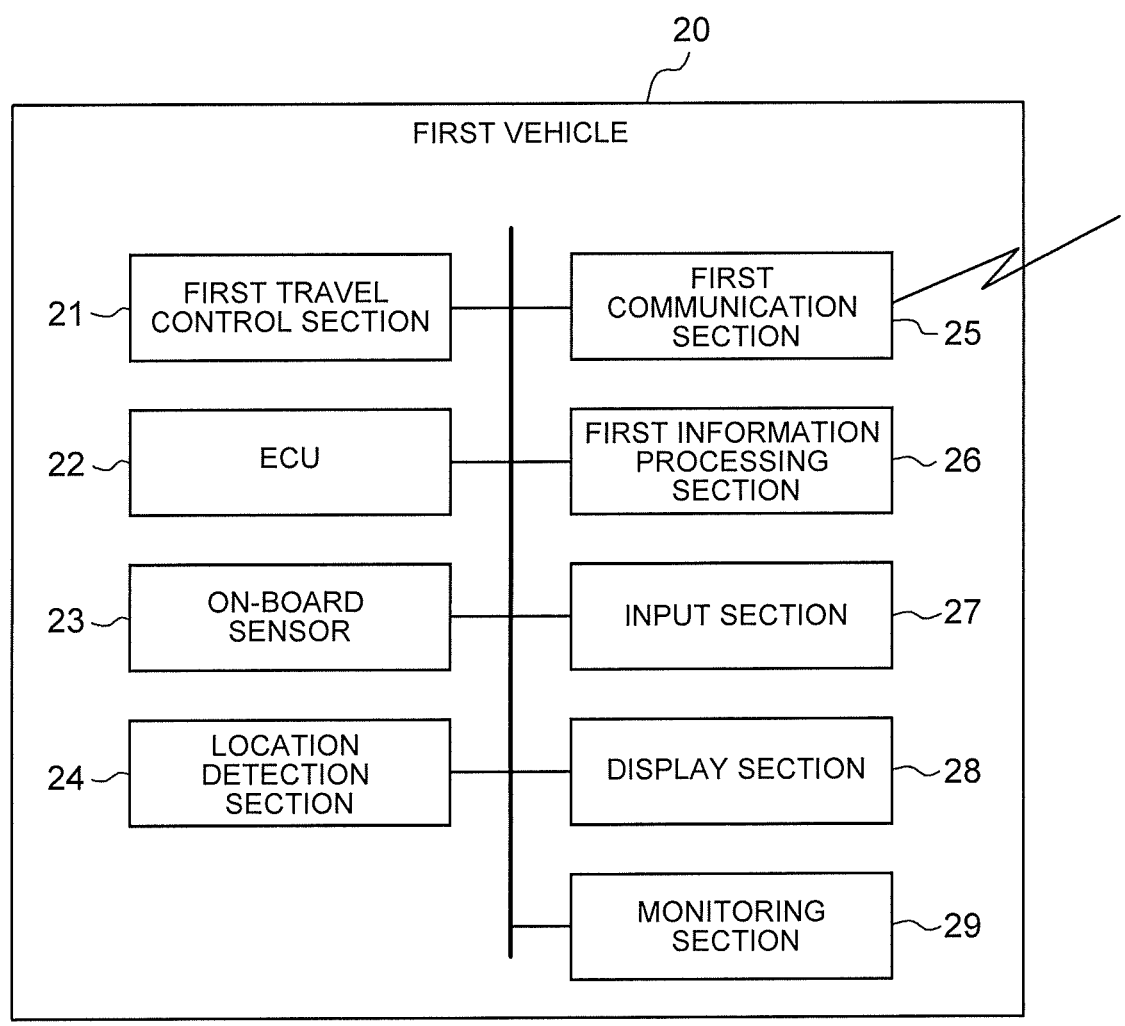
FIG. 3 is a block diagram of a schematic configuration of a first vehicle in FIG. 1.

(Configuration of First Vehicle) As illustrated in FIG. 3, the first vehicle 20 includes a first travel control section 21, plural ECUs 22, plural on-board sensors 23, a location detection section 24, a first communication section 25, a first information processing section 26, an input section 27, a display section 28, and a monitoring section 29. The sections in the first vehicle 20 are mutually connected by a network in the first vehicle 20 such as Controller Area Network (CAN), Local Interconnect Network (LIN), on-board Ethernet®, FlexRay®, or Media Oriented Systems Transport (MOST). In addition to the above, in the first vehicle 20, any equipment such as hotel equipment, ride-sharing equipment, or retail store equipment can be mounted on a cabin space according to a purpose of the service provider.

The first travel control section 21 controls the travel of the first vehicle 20. The first travel control section 21 is configured by including one or plural processors and memory. The memory of the first travel control section 21 may store the road map information. The first travel control section 21 cooperates with the ECUs 22, the on-board sensors 23, and the location detection section 24 to realize the automated travel of the first vehicle 20. The automated travel is in one of levels 1 to 5 defined by Society of Automotive Engineers (SAE), for example. However, the automated travel is not limited thereto and may be defined arbitrarily. In this embodiment, a description will be made on an assumption that the first vehicle 20 can carry out the unattended automated travel (for example, automated driving in the level 5 defined by SAE). The first travel control section 21 controls each of the sections including the ECUs 22 in the first vehicle 20 such that the first vehicle 20 travels automatically to the destination, the stopover location, or the like instructed by the first information processing section 26.

The first travel control section 21 allows alignment travel of the first vehicle 20 with another first vehicle 20 or the second vehicle 30. The alignment travel means that plural vehicles travel in line. During the alignment travel, the first travel control section 21 can exchange vehicle control information with the other first vehicle 20 or the second vehicle 30 via the first communication section 25. The vehicle control information includes information on acceleration, braking, a lane change, and the like necessary to maintain the alignment travel.

The ECUs 22 are plural electronic control units (ECUs) that control all types of equipment in the first vehicle 20. The equipment in the first vehicle 20 includes an engine, a motor, a brake, a transmission, an electronic key, power windows, an air conditioner, lamps, mirrors, a car audio system, a navigation system, and the like, and is not limited thereto. The ECUs 22 are mutually connected via a network such as CAN.

The on-board sensors 23 are various sensors mounted on the first vehicle 20. Many of the on-board sensors 23 are connected to the ECUs 22 and used for the travel control. The on-board sensors 23 that are used for the travel control include an ignition sensor, a vehicle speed sensor, an accelerator sensor, a brake sensor, a forward inter-vehicular distance sensor, a rearward inter-vehicular distance sensor, a travel lane detection sensor, an image sensor, and the like, but are not limited thereto. The on-board sensors 23 include sensors that detect a vehicle state. The on-board sensors 23 that detect the vehicle state include, for example, a fuel remaining amount sensor, a battery remaining amount sensor, a cabin temperature sensor, a coolant temperature sensor, a hydraulic pressure detection sensor, an air conditioner sensor, and the like, but are not limited thereto. The on-board sensors 23 may include sensors that detect a condition of the user. The on-board sensors 23 that detect the condition of the user include a heartbeat sensor, a body temperature sensor, and the like, but are not limited thereto.

The location detection section 24 detects the vehicle location. The vehicle location may be detected as an absolute location by latitude, longitude, and the like. The location detection section 24 can includes various detectors such as a Global Positioning System (GPS) receiver, a direction sensor, a steering angle sensor, and a distance sensor. Information on the latitude and the longitude of the current vehicle position can be acquired by using a signal from the GPS receiver. The GPS receiver measures the vehicle location by using an artificial satellite. Note that, instead of the GPS receiver or in addition to the GPS receiver, a receiver that is compatible with another Global Navigation Satellite System (GNSS) may be adopted. The other GNSS includes a satellite positioning system using a quasi-zenith satellite, for example. At the location where the current location cannot be received from the GPS receiver, the current location may be detected by dead-reckoning navigation using both of the direction sensor, such as a gyroscope sensor, and the distance sensor.

The first communication section 25 includes: a communication module that is connected to the communication network 40; and a communication module that communicates with the first vehicle 20 and the second vehicle 30 traveling nearby. Such a communication module is any of communication modules compatible with mobile communication standards such as 4th Generation (4G) and 5th Generation (5G), a communication module compatible with dedicated short-range communications (DSRC), and the like, but is not limited thereto.

The first communication section 25 can exchange various types of information with the server 10 and the second vehicle 30. For example, the first communication section 25 can transmit the current location information of the host vehicle, the service request, and the like to the server 10.

The first information processing section 26 executes various types of processing that are required for the first vehicle 20 to receive the service provided by the automated travel vehicle assistance system 1. The first information processing section 26 is configured by including one or plural processors and memory. The first information processing section 26 transmits the host vehicle position detected by the location detection section 24 to the server 10 via the first communication section 25. The first information processing section 26 can generate the service request on the basis of a specified condition, and can transmit the service request to the server 10 via the first communication section 25. The specified condition includes that specified input is received from the input section 27 and that the monitoring section 29 detects a specified state change of the first vehicle 20. The first information processing section 26 can generate the different service request according to a content of the input from the input section 27 and a content of the state change detected by the monitoring section 29. Based on the instruction from the server 10, the first information processing section 26 can cooperate with the first travel control section 21 to move the first vehicle 20 to a specified location. Based on the instruction from the server 10, the first information processing section 26 can cooperate with the first travel control section 21 to make the first vehicle 20 travel with the other first vehicle 20 or the second vehicle 30 in alignment.

The input section 27 is a device that accepts input from the user in the first vehicle 20. Information input by the user via the input section 27 possibly can include the service request that is selected from the one or plural services. The input section 27 includes devices such as a touch screen, a keyboard, a mouse, or the like. The input section 27 may also use the input device shared by another system such as telephone buttons, a game machine controller, a television remote controller, or the like. As the input section 27, dedicated buttons corresponding to the service request may be provided in the first vehicle 20.

The display section 28 displays the various information to the user who is in the first vehicle 20. The display section 28 can display selectable service requests so as to accept the input from the input section 27. The display section 28 includes a display that shows a display image on the basis of a signal from the first information processing section 26. For example, the display is any of a liquid crystal display (LCD), an electro-luminescence (EL) display, an inorganic EL display, and a plasma display panel (PDP), but is not limited thereto. In this embodiment, as an example, the touch screen in which the input section 27 and the display section 28 are integrated is adopted.

Figure 4:
FIG. 4 is a view of an example of a service selection screen on a display section in FIG. 3.

As an example, in the case where the first vehicle 20 is provided as the mobile hotel to the user, the display section 28 of the touch screen can display a service selection screen illustrated in FIG. 4. The services that can be selected from the first vehicle 20 include a restaurant service providing food and drinks in another vehicle, a catering service delivering the food and the drinks into the first vehicle 20, and a service providing entertainment such as a casino or karaoke. The services that can be selected from the first vehicle 20 further include acceptance of clothing by a cleaner, a cleaning service of the cabin of the currently-used first vehicle 20, replacement of some of equipment in the first vehicle 20, a room change service replacing the currently-used first vehicle 20 itself, and the like.

When accepting the input that is made by pressing the touch screen as the input section 27 with a finger to select the restaurant service, the first information processing section 26 generates the service request for requesting the restaurant service, and transmits the service request to the server 10 via the first communication section 25.

Similarly, when accepting the input for selecting another service from the input section 27, the first information processing section 26 generates the service request corresponding to the selected service, and transmits the service request to the server 10 via the first communication section 25.

The monitoring section 29 monitors the specified state change of the first vehicle 20. When the specified state change occurs, the monitoring section 29 notifies the first information processing section 26 of the specified state change. The monitoring section 29 can monitor output from the on-board sensors 23 to detect the state change.

For example, based on output of the battery remaining amount sensor or the fuel remaining amount sensor included in the on-board sensors 23, the monitoring section 29 can recognize that the state is changed when a remaining amount of a battery or fuel becomes equal to or smaller than a specified threshold (a specified amount). The monitoring section 29 can notify the first information processing section 26 of the reduction in the battery or the fuel. In this case, the first information processing section 26 transmits the service request for charging of the battery or filling of a fuel tank to the server 10.

In addition, for example, the monitoring section 29 can monitor radio wave reception intensity of the first communication section 25. It is considered that the stable communication cannot be maintained when the radio wave reception intensity falls below a specified value. Thus, the monitoring section 29 can notify the first information processing section 26 of such a fact. The specified value of the radio wave reception intensity can be determined on the basis of a required minimum value of the radio wave reception intensity to maintain the stable communication.

The monitoring section 29 may also recognize failure of the air conditioner in the first vehicle 20 on the basis of output of the cabin temperature sensor or the air conditioner sensor, which is included in the on-board sensors 23, in the first vehicle 20. For example, the monitoring section 29 can determine that the air conditioner fails in the case where a cabin temperature of the first vehicle 20 is higher than a set temperature by a specified temperature (for example, three degrees) or more regardless of a fact that the air conditioner is continuously operated. The monitoring section 29 can notify the first information processing section 26 of the failure of the air conditioner.

The monitoring section 29 may further recognize abnormality of the user from output of the sensor that detects the condition of the user and is included in the on-board sensors 23. The monitoring section 29 can notify the first information processing section 26 of the abnormality of the user.

When being notified by the monitoring section 29 that the state change, in which the remaining amount of the battery or the fuel becomes equal to or smaller than the specified value, is detected, the first information processing section 26 can generate the service request to request charging of the battery or filling of the fuel tank, and can transmit such a service request to the server 10 via the first communication section 25. In addition, when being notified by the monitoring section 29 that the radio wave reception intensity falls below the specified value, the first information processing section 26 can generate a service request to request alternative communication means, and can transmit such a service request to the server 10 via the first communication section 25. Furthermore, when being notified by the monitoring section 29 of the failure of the air conditioner, the first information processing section 26 can generate the service request to repair the air conditioner or replace the vehicle itself, and can transmit such a service request to the server 10 via the first communication section 25. Moreover, when being notified by the monitoring section 29 of the abnormality of the user, the first information processing section 26 can transmit a service request to call for an ambulance to the server 10 via the first communication section 25. Similarly, when being notified by the monitoring section 29 of the other state change, the first information processing section 26 generates a service request corresponding to the detected state change, and transmits such a service request to the server 10 via the first communication section 25.

Note that only one of the input section 27 and the monitoring section 29 may be provided in the first vehicle 20.

Figure 5:
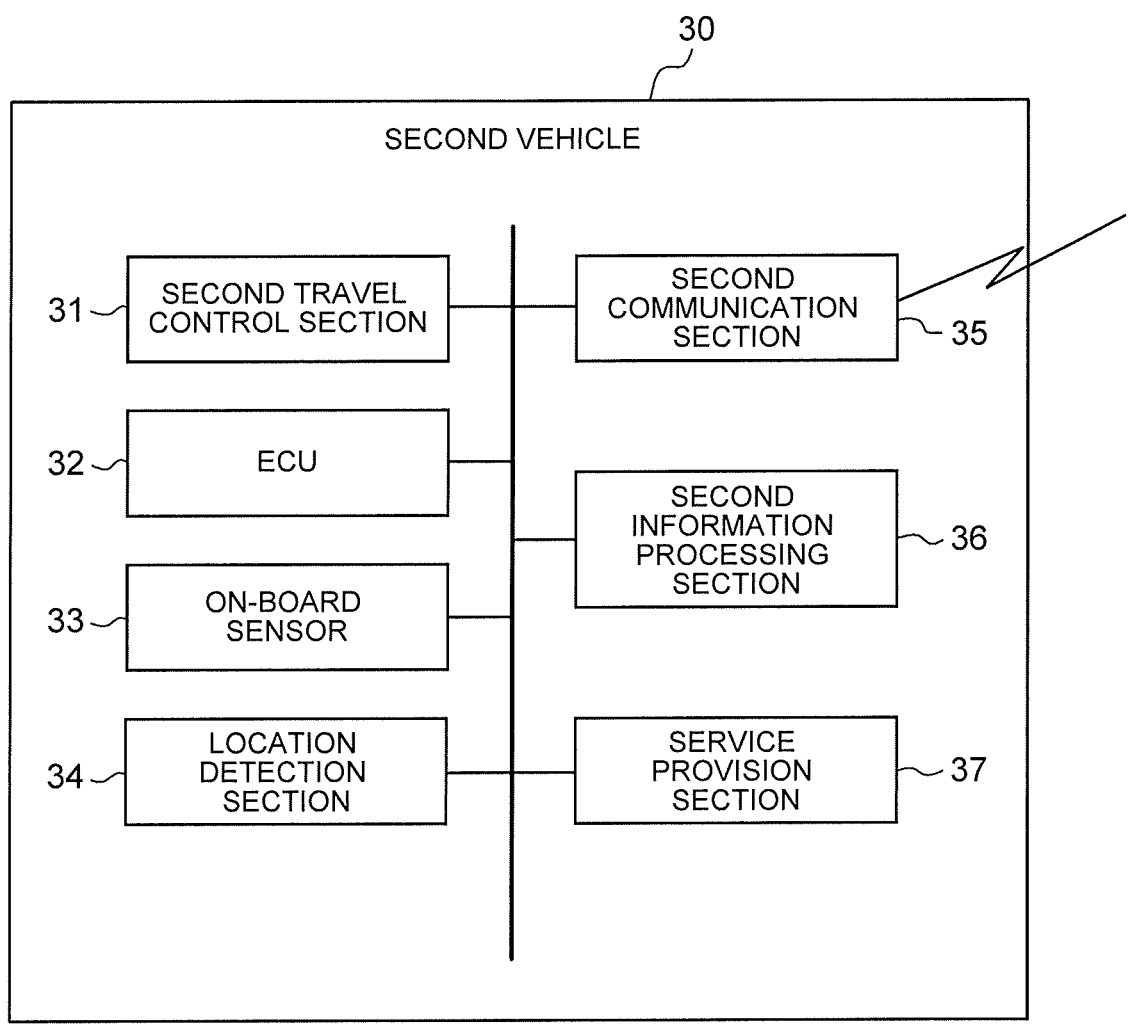
FIG. 5 is a block diagram of a schematic configuration of a second vehicle in FIG. 1.

(Configuration of Second Vehicle) As illustrated in FIG. 5, the second vehicle 30 includes a second travel control section 31, plural ECUs 32, plural on-board sensors 33, a location detection section 34, a second communication section 35, a second information processing section 36, and a service provision section 37. The sections in the second vehicle 30 are mutually connected by a network in the second vehicle 30 such as CAN, LIN, on-board Ethernet®, FlexRay®, or MOST. The second vehicles 30 include one or more types of vehicles that have different functions and provide different services.

Similar to the first travel control section 21 in the first vehicle 20, the second travel control section 31 controls travel of the second vehicle 30. The second travel control section 31 is configured by including one or plural processors and memory. The memory of the second travel control section 31 may store the road map information. The second travel control section 31 cooperates with the ECUs 32, the on-board sensors 33, and the location detection section 34 so as to be able to realize the automated travel of the second vehicle 30. The same/similar points of the second travel control section 31 as/to the first travel control section 21 will not be described. The second travel control section 31 controls each of the sections including the ECUs 32 in the second vehicle 30 such that the second vehicle 30 travels automatically to a point instructed by the second information processing section 36.

The second travel control section 31 allows the alignment travel of the second vehicle 30 with the first vehicle 20, which transmits the service request, and another first vehicle 20 or another second vehicle 30. During the alignment travel, the second travel control section 31 can exchange the vehicle control information with the first vehicle 20 and the other first vehicle 20 or the other second vehicle 30 via the second communication section 35.

The ECUs 32 are plural ECUs that are similar to the ECUs 22 in the first vehicle 20 and control all types of equipment in the second vehicle 30.

The on-board sensors 33 are various sensors that are similar to the on-board sensors 23 in the first vehicle 20 and are mounted on the second vehicle 30.

The location detection section 34 is similar to the location detection section 24 in the first vehicle 20, and detects the location of the second vehicle 30.

The second communication section 35 is similar to the first communication section 25 in the first vehicle 20 and includes: a communication module that is connected to the communication network 40; and a communication module that communicates with the first vehicle 20 and the second vehicle 30 traveling nearby.

The second communication section 35 can exchange the various types of the information with the server 10. For example, the second communication section 35 receives the service provision instruction from the server 10. In addition, the second communication section 35 can transmit the location information to the server 10.

Furthermore, the second communication section 35 can receive the service provision instruction from the server 10.

Based on the service provision instruction, the second information processing section 36 executes a procedure of providing the specified service to the first vehicle 20, from which the service request is transmitted, or the user of the first vehicle 20, who transmits the service request. The second information processing section 36 is configured by including one or plural processors and memory. When receiving the service provision instruction from the server 10, in order to provide the service specified in the service provision instruction to the first vehicle 20, the second information processing section 36 cooperates with the second travel control section 31 to move the second vehicle 30 to a location where the service is provided. While the service provision section 37 provides the service, the second information processing section 36 can cooperate with the second travel control section 31 to make the second vehicle 30 travel with the first vehicle 20, to which the service is provided, in alignment on the basis of the instruction from the server 10.

The service provision section 37 provides the various services to the first vehicle 20 and/or the user thereof. The plural types of the second vehicles 30, in each of which the service provision section 37 has the different function from each other and thus provides the different service from each other, can exist. The service provision section 37 can use a majority of the cabin space in the second vehicle 30. The service provision section 37 can further includes hardware such as a processor, memory, and various sensors. The service provision section 37 can exchange the information with the server 10 via the second communication section 35. For example, the service provision section 37 can transmit, to the first vehicle 20 and/or the user thereof, that the service starts being provided, that the service finishes being provided, and the like to the server 10.

The services provided by the service provision section 37 can include the restaurant service, the catering service, the casino service, the karaoke service, and the like, for example. For example, in the case where the service provision section 37 provides the restaurant service, the service provision section 37 in the second vehicle 30 can include cooking equipment, ingredients, drinks, dishes, tables, chairs, and the like. In the service provision section 37, a chef can get on to cook and provide a meal to the user. The user can move from the first vehicle 20 to the second vehicle 30 to enjoy the meal. Even during the meal, the user can continue traveling by the alignment travel of the first vehicle 20 and the second vehicle 30. The casino service and the karaoke service can be provided by the second vehicle 30 that includes, as the service provision section 37, casino equipment and karaoke equipment. In the case where the service provision section 37 provides the catering service, the service provision section 37 can transport and provide the cooked meal to the user of the first vehicle 20.

For example, in the case where the service provided by the service provision section 37 is the service of charging the battery in the first vehicle 20, from which the service request for charging of the battery is transmitted, the service provision section 37 includes a storage battery and tools used to charge the battery. In this case, a worker who charges the battery may get on the service provision section 37. Alternatively, by automatic control without intervention of the person, the battery may be charged in the first vehicle 20 from the second vehicle 30 that is parked next to the first vehicle 20. Furthermore, the second vehicle 30 that charges the battery may be configured to be able to charge the battery in the first vehicle 20 while being in the travel state. The battery can be charged either wired or wireless.

In addition, for example, the service provision section 37 can provide a satellite communication service to the first vehicle 20 in which the first communication section 25 does not have communication means by satellite communication. In such a case, the service provision section 37 includes a satellite communication base station. The second vehicle 30 that includes the service provision section 37 having the satellite communication base station can travel with the first vehicle 20, which transmits a service request for alternative communication means, in alignment and thus can mediate the communication between the first vehicle 20 and the server 10 by using the satellite communication. In this case, communication between the first vehicle 20 and the second vehicle 30 can be carried out by using inter-vehicular communication. In this way, the automated travel vehicle assistance system 1 can keep providing the service to the first vehicle 20 even in a poor radio wave condition. The service provision section 37 in the second vehicle 30 may mediate communication between the first vehicle 20 and a system other than the server 10.

Figure 6:
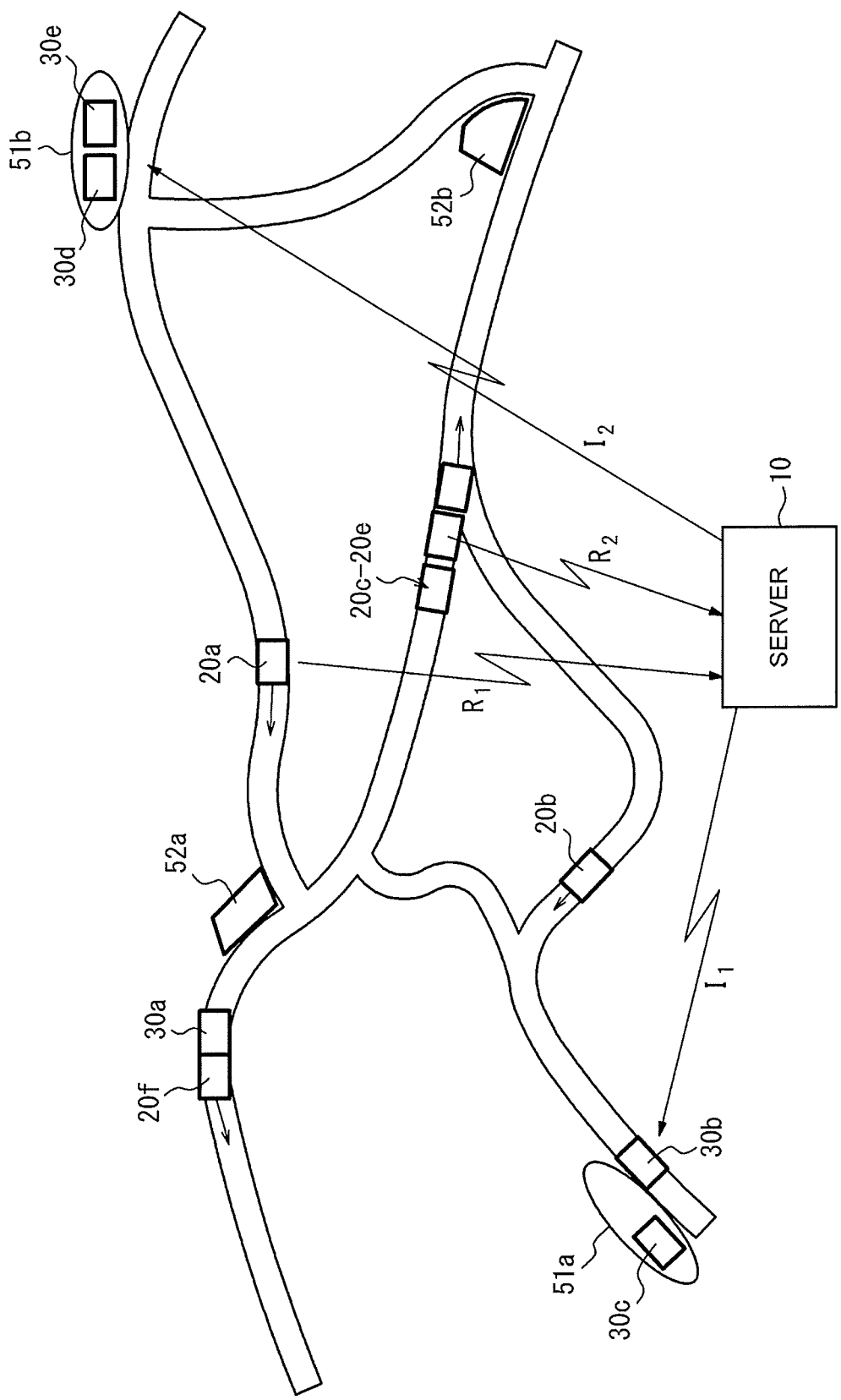
FIG. 6 is a view for illustrating a method for providing a service to the first vehicle.

Next, a description will be made on a method for providing the service to the first vehicle 20 by the automated travel vehicle assistance system 1 with reference to FIG. 6. FIG. 6 illustrates a road map in a certain virtual area. In FIG. 6, first vehicles 20a and 20b as some of the first vehicles 20 each travel on a road alone. Three first vehicles 20c to 20e travel in alignment. For example, it can be assumed that the first vehicles 20c to 20e are vehicles customized for hotel use and used for the package tour provided by the travel agency. Users in the first vehicles 20c to 20e move to the same destination by the alignment travel. A first vehicle 20f travels with a second vehicle 30a, which provides a service to the first vehicle 20f or a user of the first vehicle 20f, in alignment.

Second vehicles 30b and 30c are located at a service base 51a where the plural second vehicles 30 stand by. (The second vehicle 30b is illustrated to leave the service base 51a just now.) Second vehicles 30d and 30e are located at a service base 51b where the plural second vehicles 30 stand by. In order to handle the service requests from the first vehicles 20, the second vehicles 30 stand by at the service bases 51a, 51b dispersed at separate locations. The second vehicle 30 can wait for the service provision instruction not only by standing by at such a specified stand-by location but also by appropriately traveling on a road.

Note that the first vehicles 20 for replacement can also stand by at the service bases 51a and 51b. The first vehicle 20 for replacement is dispatched to the first vehicle 20, which transmits the service request, when the first vehicle 20 transmits a first request for the replacement of the vehicle. Each of the first vehicles 20 includes a unit for storing the user's valuable items, and such a unit portion can safely be placed in the different first vehicle 20. In this way, for example, while the user is away from the first vehicle 20, the first vehicle 20 can be replaced. For example, in the case where the first vehicle 20 is used as the hotel, the first vehicle 20 itself is replaced. In this way, cleaning work of the vehicle, bed making work, and the like become unnecessary.

In FIG. 6, for example, the first vehicle 20a transmits a service request $R_1$ to the server 10. Based on a content of the service request $R_1$ as well as location, a destination, and the like of the first vehicle 20a, the server 10 selects the appropriate second vehicle 30b and transmits a service provision instruction $I_1$. The server 10 specifies a service provision location 52a with respect to the first vehicle 20a and the second vehicle 30b. The first vehicle 20a and the second vehicle 30b meet at the service provision location 52a. For example, in the case where the content of the service request $R_1$ is the request for the restaurant service, a user of the first vehicle 20a can move to the second vehicle 30b to receive the restaurant service. In addition, while the restaurant service is provided, similar to the first vehicle 20f and the second vehicle 30a, which are illustrated, the first vehicle 20a and the second vehicle 30b can travel in alignment. Thus, the first vehicle 20a and the second vehicle 30b can continue moving to the user's destination by the automated travel.

Furthermore, in FIG. 6, for example, the first vehicle 20d transmits a service request $R_2$ to the server 10. Based on a content of the service request $R_2$ as well as location, a destination, and the like of the first vehicle 20d, the server 10 selects the appropriate second vehicle 30d and transmits a service provision instruction $I_2$. The server 10 specifies a service provision location 52b with respect to the first vehicle 20d and the second vehicle 30d. Based on a content and provision time of a service requested by the first vehicle 20d, the server 10 can determine whether the first vehicle 20d separates from the alignment travel at the service provision location 52b. For example, in the case where the second vehicle 30d provides a battery charging service to the first vehicle 20d, the server 10 can make the other first vehicles 20c and 20e in the alignment travel stand by until the service provided to the first vehicle 20d is finished.

Next, a description will be made on a processing procedure of the automated travel vehicle assistance system 1 with reference to a workflow in FIG. 7. The method disclosed in the present specification can be executed by the server information processing section 12 in the server 10, the first information processing section 26 in the first vehicle 20, and the processor of the second information processing section 36 in the second vehicle 30 according to the program. Such a program can be stored in a non-transitory computer readable medium. Examples of the non-transitory computer readable medium are the hard disk, the RAM, the ROM, the flash memory, a CD-ROM, an optical storage device, and a magnetic storage device but are not limited thereto.

As a precondition, the service-providing vehicle stands by at a specified location (step S101).

In the first vehicle 20, the first information processing section 26 generates the service request according to the specified condition (step S102). As the specified condition, the input is received from the input section 27. Alternatively, as the specified condition, the monitoring section 29 detects the specified state change. Under such a specified condition, the first information processing section 26 generates the service request.

In the first vehicle 20, the first information processing section 26 transmits the service request to the server 10 (S103).

When receiving the service request from the first vehicle 20, the server 10 determines the service-providing vehicle corresponding to this service request (step S104). At least one of the first vehicle 20 that differs from the first vehicle 20 transmitting the service request and the second vehicle 30 can be set as the service-providing vehicle.

In the case where the content of the service request is the replacement of the vehicle, the first vehicle 20 is set as the service-providing vehicle. In the case where the content of the service request is other than the replacement of the vehicle, the second vehicle 30 is set as the service-providing vehicle. In the case where the content of the service request is the provision of the restaurant service, the second vehicle 30 including the equipment for providing the food and the drinks is set as the service-providing vehicle. In the case where the content of the service request is charging of the battery, the second vehicle 30 having the battery charging function is set as the service-providing vehicle. In the case where the content of the service request is the request for the alternative communication means, the second vehicle 30 that includes the satellite communication base station and mediates the communication between the first vehicle 20 and the server 10 is set as the service-providing vehicle.

The server 10 generates the service provision instruction to dispatch the determined service-providing vehicle to the first vehicle 20 that transmits the service request, and transmits this service provision instruction to the service-providing vehicle (step S105). The service provision instruction may include the locations of the service provision locations 52*a* and 52*b* where the service-providing vehicle meets the first vehicle 20.

The service-providing vehicle that accepts the service provision instruction starts moving to the location of the first vehicle 20 (step S106).

The server 10 further notifies the first vehicle 20, which transmits the service request, of information, such as the acceptance of the service request, the service provision locations 52*a*, 52*b*, and the time at which the service is provided, as service plan notification (step S107).

Due to the control from the server 10, the first vehicle 20 and the service-providing vehicle meet at the specified location (steps S108, S109).

The service-providing vehicle provides the specified service to the first vehicle 20 (step S110). The first vehicle 20 receives the service from the service-providing vehicle (step S111).

When the provision of the service is finished, the service-providing vehicle may transmit service provision completion notification, which indicates that the provision of the service is finished, to the server 10 (step S112). The first vehicle 20, which transmits the service request, may transmit service reception completion notification, which indicates the reception of the service is completed, to the server 10 (step S113).

When receiving the service provision completion notification from the service-providing vehicle and receiving the service reception completion notification from the first vehicle 20, which transmits the service request, the server 10 executes termination processing (step S114). For example, the server 10 records service provision history in the server storage section 13. In addition, for example, the server 10 instructs the first vehicle 20, which has been replaced, or the second vehicle 30, which has provided the service, to return to one of the service bases Ma, Mb As it has been described so far, with the automated travel vehicle assistance system 1 according to this embodiment, the various services can be provided to the first vehicle 20 as the automated travel vehicle and the user thereof by using another first vehicle 20 and any of the second vehicles 30 having the various different functions.

In addition, according to the automated travel vehicle assistance system 1, it is possible to provide the services corresponding to various use situations of the first vehicle 20, such as lodgment, a trip, and the ride-sharing.

In addition, since the first vehicle 20 can travel with another first vehicle 20 and the second vehicle 30 in alignment, the user can receive the service provided by the second vehicle 30 while keep moving.

Furthermore, since the user of the first vehicle 20 can select the necessary service by using the input section 27, the user's convenience is enhanced. Since the second vehicle 30 is dispatched to the first vehicle 20 only when necessary, use efficiency of the second vehicle 30 is high. For example, in the case where the first vehicle 20 is used as the hotel, the second vehicle 30, which provides the restaurant service, does not always have to travel with the first vehicle 20.

Moreover, when the monitoring section 29 monitors the state change of the first vehicle 20 and detects the specified state change, the service request is automatically transmitted to the server 10. Accordingly, it is possible to handle the state change of the first vehicle 20 even when the user does not notice such a state change. In this way, continuity of the service provided to the first vehicle 20 and stability of the operation can be maintained.

The disclosure is not limited to the above-described embodiment, and various alterations or modifications can be made thereto. For example, functions and the like provided in each means, each step, or the like may be rearranged unless otherwise contradicted logically. In addition, the plurality of means, the plurality of the steps, or the like may be combined into one or may be divided.

What is claimed is:

1. An automated travel vehicle assistance system, comprising:
    plural first vehicles, each of which used for movement of a user;
    one or more types of plural second vehicles, each of which has a different function from the first vehicles; and
    a server configured to manage operation of the first vehicles and the second vehicles, wherein
    each of the first vehicles includes:
        a first travel control section configured to control the respective first vehicle, on which the first travel control section is mounted, to travel with at least one of (i) another of the first vehicles and (ii) at least one of the second vehicles in alignment on the basis of an instruction from the server,
        a first information processing section configured to generate a service request on the basis of a specified condition, and
        a first communication section configured to transmit the service request, which is generated by the first information processing section, to the server, and
    when receiving the service request from a service requesting first vehicle of the first vehicles, the server is configured to:
        determine at least one of (i) one of the first vehicles, which differs from the service requesting first vehicle, and (ii) one of the second vehicles as a service-providing vehicle corresponding to the service request including:
            setting the one of the first vehicles as the service-providing vehicle in a case where the service request from the service requesting first vehicle includes a request for a replacement vehicle, and
            setting the one of the second vehicles as the service providing vehicle in a case where the service request from the service requesting first vehicle includes a request other than the request for the replacement vehicle,
        generate a service provision instruction to dispatch the determined service-providing vehicle to the service requesting first vehicle, and
        transmitting the service provision instruction to the determined service-providing vehicle.

2. The automated travel vehicle assistance system according to claim 1, wherein
    each of the first vehicles includes an input section configured to receive an input from the user, and
    each of the first information processing sections is configured to generate the service request on the basis of the input received from the respective input section.

3. The automated travel vehicle assistance system according to claim 2, wherein
    each of the first information processing sections is configured to generate the service request, by which a particular service is provided to the user, on the basis of the respective input from the user, and the server is configured to transmit the service provision instruction to a second vehicle of the second vehicles that is configured to provide the particular service to the user.

4. The automated travel vehicle assistance system according to claim 3, wherein the particular service includes any of a provision of food and drinks, a cleaning of an inside of the service requesting first vehicle, an acceptance of clothing by a cleaner, and a replacement of equipment in the service requesting first vehicle.

5. The automated travel vehicle assistance system according to claim 1, wherein
each of the first vehicles includes a monitoring section configured to monitor a specified state change of the respective first vehicle, and
each of the first information processing sections is configured to generate the service request under the specified condition that the respective monitoring section detects the specified state change.

6. The automated travel vehicle assistance system according to claim 5, wherein
each of the monitoring sections is configured to monitor a remaining amount of a battery used in the respective first vehicle,
each of the first information processing sections is configured to transmit the service request to charge the battery when the remaining amount of the battery becomes smaller than a specified amount, and
the server is configured to generate the service provision instruction to dispatch a second vehicle of the second vehicle that includes a battery charging function when receiving the service request to charge the battery.

7. The automated travel vehicle assistance system according to claim 5, wherein
each of the first communication sections does not have satellite communication equipment,
each of the monitoring sections is configured to monitor a radio wave reception intensity of the respective first communication section,
each of the first information processing sections is configured to transmit the service request to request alternative communication equipment when the radio wave reception intensity falls below a specified value, and
the server is configured to generate the service provision instruction to dispatch a second vehicle of the second vehicles, which includes a satellite communication base station and mediates communication between the service requesting first vehicle and the server, when receiving the service request to request the alternative communication equipment.

8. The automated travel vehicle assistance system according to claim 1, wherein the one of the second vehicles includes: a second travel control section, a second communication section, and a second information processing section,
a second communication section configured to receive the service provision instruction from the server,
a second travel control section configured to make the one of the second vehicle moves to vicinity of the service requesting first vehicle on the basis of the service provision instruction, and
a second information processing section configured to execute a procedure of providing a service to the service requesting first vehicle or the user of the service requesting first vehicle on the basis of the service provision instruction.

9. The automated travel vehicle assistance system according to claim 8, wherein the second travel control section is configured to control the one of the second vehicles to travel at least with the service requesting first vehicle in alignment.

10. The automated travel vehicle assistance system according to claim 1, wherein
the service request is the request for the replacement vehicle, and
when receiving the service request, the server is configured to:
determine the one of the first vehicles as the service-providing vehicle, and
dispatch the service-providing vehicle to the service requesting first vehicle.

11. A server that manages operation of plural first vehicles, each of which is used for movement of a user, and one or more types of plural second vehicles, each of which has a different function from the first vehicles, the server comprising:
a server communication section; and
a server information processing section, wherein
the server communication section is configured to receive a service request from a service requesting first vehicle of the first vehicles,
the service request is generated by the service requesting first vehicle on the basis of a specified condition,
the server information processing section is configured to, when receiving the service request from the service requesting first vehicle:
determine at least one of (i) one of the first vehicles, which differs from the service requesting first vehicle, and (ii) one of the second vehicles as a service-providing vehicle including:
setting the one of the first vehicles as the service-providing vehicle in a case where the service request from the service requesting first vehicle includes a request for a replacement vehicle, and
setting the one of the second vehicles as the service providing vehicle in a case where the service request from the service requesting first vehicle includes a request other than the request for the replacement vehicle, and
generate a service provision instruction to dispatch the determined service-providing vehicle to the service requesting first vehicle, and
the server communication section is configured to transmit the service provision instruction to the determined service-providing vehicle.

\* \* \* \* \*